United States Patent
Sato et al.

(10) Patent No.: US 11,932,770 B2
(45) Date of Patent: Mar. 19, 2024

(54) METHOD FOR PRODUCING RESIN SINTERED BODY

(71) Applicants: SANKEI GIKEN KOGYO CO., LTD., Tokyo (JP); Honda Motor Co., Ltd., Tokyo (JP); SOLIZE Corporation, Tokyo (JP)

(72) Inventors: Daisuke Sato, Tokyo (JP); Kazuo Igarashi, Wako (JP); Hiroyuki Ikeno, Wako (JP); Satoru Nishimoto, Wako (JP); Takashi Inomata, Tokyo (JP); Ryota Masuda, Tokyo (JP); Kohei Mutai, Tokyo (JP)

(73) Assignees: SANKEI GIKEN KOGYO CO., LTD., Tokyo (JP); HONDA MOTOR CO., LTD., Tokyo (JP); SOLIZE CORPORATION, Tokyo (JP)

(*) Notice: Subject to any disclaimer, the term of this patent is extended or adjusted under 35 U.S.C. 154(b) by 0 days.

(21) Appl. No.: 17/693,905

(22) Filed: Mar. 14, 2022

(65) Prior Publication Data
US 2022/0298370 A1    Sep. 22, 2022

(30) Foreign Application Priority Data
Mar. 18, 2021   (JP) .................................. 2021-045304

(51) Int. Cl.
| | | |
|---|---|---|
| C09D 11/322 | (2014.01) | |
| B29C 64/165 | (2017.01) | |
| B29C 64/30 | (2017.01) | |
| B29C 71/00 | (2006.01) | |
| B29K 101/12 | (2006.01) | |
| B33Y 10/00 | (2015.01) | |
| B33Y 40/20 | (2020.01) | |
| C09D 11/037 | (2014.01) | |
| C09D 11/102 | (2014.01) | |
| C09D 11/38 | (2014.01) | |

(52) U.S. Cl.
CPC .......... *C09D 11/322* (2013.01); *B29C 64/165* (2017.08); *B29C 64/30* (2017.08); *B29C 71/0009* (2013.01); *B33Y 10/00* (2014.12); *B33Y 40/20* (2020.01); *C09D 11/037* (2013.01); *C09D 11/102* (2013.01); *C09D 11/38* (2013.01); *B29K 2101/12* (2013.01)

(58) Field of Classification Search
CPC ..... B29C 64/1153; B29C 64/65; B29C 64/30; B29C 64/35; B29C 64/307; B33Y 10/00; B33Y 40/00; C09D 11/102; C09D 11/38; C09D 11/037; C09D 11/324
See application file for complete search history.

(56) References Cited

U.S. PATENT DOCUMENTS

2021/0069972 A1 * 3/2021 Badesha ............... B22D 23/003
2022/0152704 A1 * 5/2022 Dong ...................... C25D 11/36

FOREIGN PATENT DOCUMENTS

| CN | 109483870 | * 3/2019 | ............. B29C 64/35 |
|---|---|---|---|
| JP | 2019-89348 A | 6/2019 | |

* cited by examiner

*Primary Examiner* — Nahida Sultana
(74) *Attorney, Agent, or Firm* — WHDA, LLP

(57) ABSTRACT

A method for producing a resin sintered body 1 by applying an ink 3 to thermoplastic resin powder 2 and sintering the powder, the method including the step of immersing an intermediate resin sintered body 1*m*, which has an unevenly colored region on the surface thereof and the whole of which has been already sintered, in a surface treatment liquid containing sulfuric acid and chromic anhydride, in which the concentration of chromic anhydride is 300 g/L or more, for 5 minutes or longer. When producing a resin sintered body by sintering thermoplastic resin powder, the surface of the resin sintered body can be evenly and sufficiently colored to an extent required without an unevenly colored region on the surface thereof, and also the surface of the resin sintered body can have a good appearance and smoothness.

16 Claims, 3 Drawing Sheets

(a)

(b)

METHOD FOR PRODUCING RESIN SINTERED BODY

TECHNICAL FIELD

The present invention relates to a method for producing a resin sintered body by sintering thermoplastic resin powder to form the resin sintered body.

BACKGROUND ART

As a technique for forming a resin sintered body by sintering thermoplastic resin powder, MJF method (multi jet fusion method) has been conventionally known, in which resin powder is sintered using additive manufacturing by a 3D printer. In this MJF method, layers of resin powder of a polyamide such as Polyamide 12 are formed, and a fusing agent including an ink such as a light absorbing ink to promote fusion, and a fusion modifier to prevent fusion by the action of vaporization heat are applied to each desired site in the layers of resin powder. The layers of resin powder to which the fusing agent and fusion modifier have been applied are fused by exposing each layer to light or heating to form a resin sintered body (see Patent Literature 1).

CITATION LIST

Patent Literature

Patent Literature 1: Japanese Unexamined Patent Application Publication No. 2019-89348

SUMMARY OF INVENTION

Technical Problem

Incidentally, when a resin sintered body is formed by repeating the step of applying an ink to layers of resin powder and sintering the layers by the MJF method, the inside thereof is well colored with the ink; however, uncolored resin powder is incorporated into a sintered portion of each layer on the outer surface near the boundary between the fusing agent and the fusion modifier. There is therefore a problem in that the surface of the outermost layer formed near the boundary between the fusing agent and fusion modifier is not evenly colored. In addition, the roughness of resin powder remains on the surface of the outermost sintered layer, and thus there is also a problem in that smoothness is poor.

The present invention is proposed in view of the above problems, and an object thereof is to provide a method for producing a resin sintered body, by which when producing a resin sintered body by sintering thermoplastic resin powder, the surface of the resin sintered body can be evenly and sufficiently colored to an extent required without an unevenly colored region on the surface thereof, and also the surface of the resin sintered body can have a good appearance and smoothness.

Solution to Problem

The method for producing a resin sintered body in the present invention is a method for producing a resin sintered body by applying an ink to thermoplastic resin powder and sintering the powder, and the method is characterized by including the step of immersing an intermediate resin sintered body, which has an unevenly colored region on the surface thereof and the whole of which has been already sintered, in a treatment liquid containing sulfuric acid and chromic anhydride. In the step of immersion in the treatment liquid, it is suitable that the concentration of the chromic anhydride in the treatment liquid be 300 g/L or more and the time for immersion be 5 minutes or longer.

This ensures that a required range on the surface of the intermediate resin sintered body is etched to remove the surface portion of the intermediate resin sintered body, which is not evenly colored with the ink. Accordingly, the surface of the resin sintered body can be evenly and sufficiently colored to an extent required, and also the surface of the resin sintered body can have a good appearance and smoothness. In addition, uniform etching can be carried out by the immersion treatment in a surface treatment liquid without being bound by the shapes of the intermediate resin sintered body and resin sintered body, and thus versatility is excellent.

The method for producing a resin sintered body in the present invention is characterized by carrying out the step of immersing the intermediate resin sintered body in the surface treatment liquid with the temperature of the surface treatment liquid maintained at 70° C. or higher.

This ensures that a resin sintered body can be obtained, which has a surface which is evenly and sufficiently colored and has a good appearance and smoothness, and which has an excellent exterior. In addition, a resin sintered body, which has a surface which is evenly and sufficiently colored and has a good appearance and smoothness, can be obtained in a shorter time, and producing efficiency can be increased.

The method for producing a resin sintered body in the present invention is characterized by carrying out the step of immersion in the surface treatment liquid with the concentration of the sulfuric acid set at 184 g/L to 368 g/L and the concentration of the chromic anhydride set at 300 g/L to 500 g/L in the surface treatment liquid.

This ensures that a resin sintered body can be obtained, which has a surface which is evenly and sufficiently colored and has a good appearance and smoothness, and which has an excellent exterior.

The method for producing a resin sintered body in the present invention is characterized in that the thermoplastic resin is Polyamide 12.

This ensures that a resin sintered body of Polyamide 12 can be obtained, which has a surface which is evenly and sufficiently colored and has a good appearance and smoothness, and which has an excellent exterior.

The method for producing a resin sintered body in the present invention is characterized by forming the intermediate resin sintered body by applying an ink to layers of thermoplastic resin powder and sintering the layers by the multi jet fusion-type additive manufacturing.

This ensures that as the resin sintered body obtained by applying an ink to layers of thermoplastic resin powder and sintering the layers by the multi jet fusion-type additive manufacturing, a resin sintered body can be obtained, which has a surface which is evenly and sufficiently colored and has a good appearance and smoothness.

Advantageous Effect of Invention

According to the method for producing a resin sintered body in the present invention, the surface of the resin sintered body can be evenly and sufficiently colored to an extent required, and also the surface of the resin sintered body can have a good appearance and smoothness.

DESCRIPTION OF EMBODIMENT

[Method for Producing Resin Sintered Body in Embodiment]

The method for producing a resin sintered body in the embodiment of the present invention is a method for producing a resin sintered body using the MJF (multi jet fusion)-type additive manufacturing by a 3D printer. Layers of thermoplastic resin powder are formed, and a fusing agent including a coloring ink to promote fusion, and a fusion modifier to prevent fusion by the action of vaporization heat are applied to each desired site in the layers of resin powder. Then, the layers of resin powder to which the fusing agent and the fusion modifier have been applied are fused and sintered by heating or exposing each layer to light from an infrared or near infrared light source or a halogen light source. The step of applying an ink to the layers of resin powder and sintering the layers is repeated to form a resin sintered body including a plurality of layers of resin powder. It should be noted that thermoplastic resin powder used may be appropriately selected from applicable materials. For example, Polyamide 11, Polyamide 12 and polypropylene are suitable and in particular Polyamide 12 is more suitable.

Figure 1:
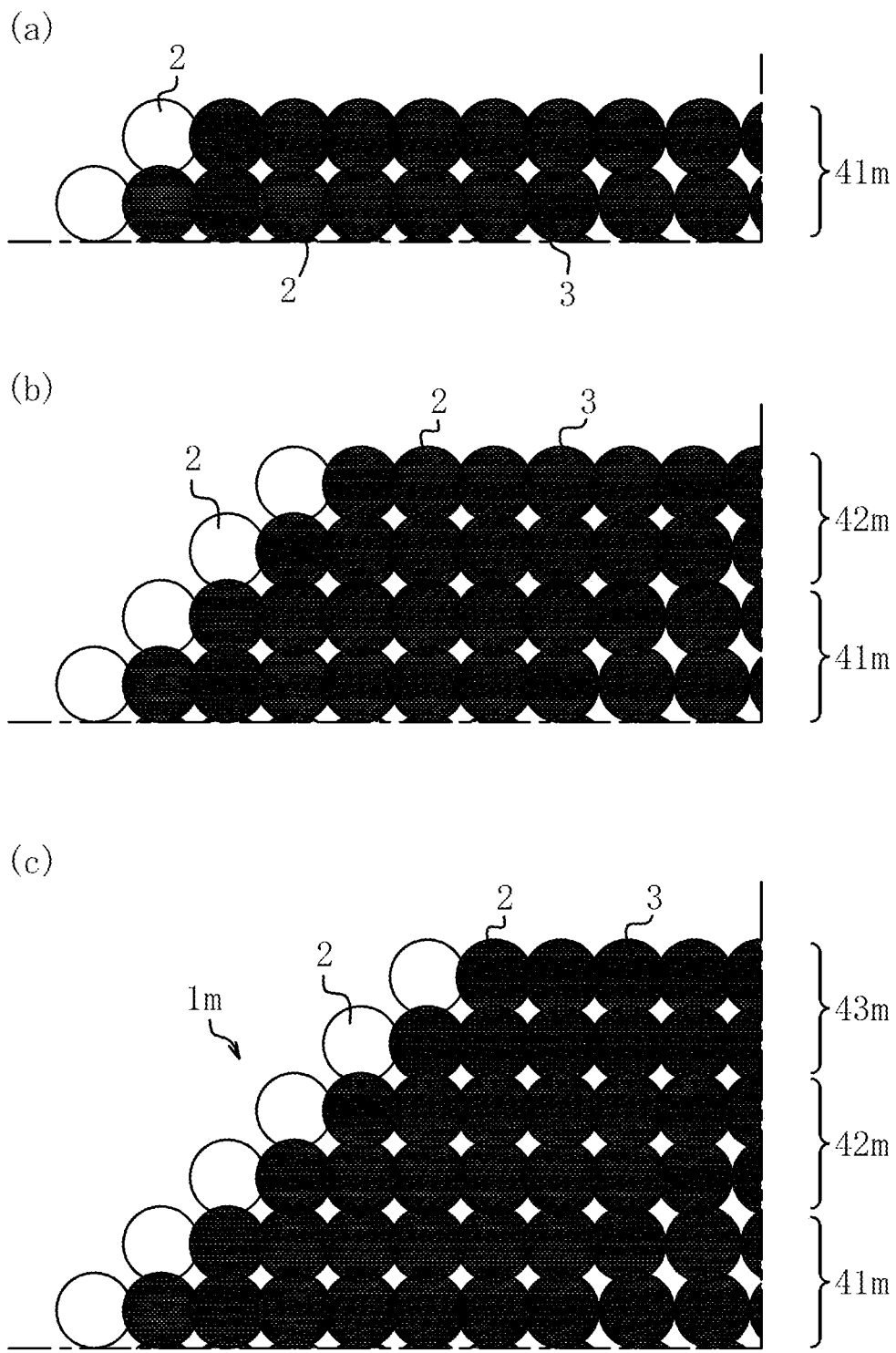
FIGS. 1(a) to (c) are schematic drawings to explain steps, which show the production steps of forming an intermediate resin sintered body of a resin sintered body in the embodiment of the present invention.

As shown in FIG. 1(a), for example, a layer of thermoplastic resin powder 2 is formed, and a fusing agent including an ink 3 and a fusion modifier are applied to the layer of resin powder 2 to color the resin powder 2 with the ink 3. This colored layer is fused and sintered by heating or exposure to light to form a sintered layer 41m. At this time, the resin powder 2 can be colored with the ink 3 in the inside of the sintered layer 41m. However, uncolored resin powder 2 is incorporated into the colored portion of the sintered layer 41m by heat of the sintered layer 41m on the outer surface of the sintered layer 41m corresponding to the vicinity of the boundary between the fusing agent and the fusion modifier (the inclined surface in the drawing), and an unevenly colored region is generated. It should be noted that resin powder 2 is schematically shown with a spherical shape and after sintered, resin powder 2 is also schematically shown with a partially retained shape in FIG. 1 and FIG. 2 described below; however, in fact, colored and sintered resin powder 2 is melted and coheres with no space.

After that, as shown in FIG. 1(b), a layer of thermoplastic resin powder 2 is formed so that the layer will be laminated on the upper side of the sintered layer 41m, and a fusing agent including an ink 3 and a fusion modifier are applied to the layer of resin powder 2 to color the resin powder 2 with the ink 3. This colored layer is fused and sintered by heating or exposure to light to form a sintered layer 42m. Also in this case, uncolored resin powder 2 is incorporated into the colored portion of the sintered layer 42m by heat of the sintered layer 42m on the outer surface of the sintered layer 42m corresponding to the vicinity of the boundary between the fusing agent and the fusion modifier (the inclined surface in the drawing), and an unevenly colored region is generated.

Similarly, when a sintered layer 43m is formed so that the layer will be laminated on the upper side of the sintered layer 42m, uncolored resin powder 2 is incorporated into the colored portion of the sintered layer 43m on the outer surface of the sintered layer 43m corresponding to the vicinity of the boundary between the fusing agent and the fusion modifier (the inclined surface in the drawing), and an unevenly colored region is generated (see FIG. 1(c)). That is, in the intermediate resin sintered body 1m that has been already sintered as a whole, which is an intermediate product composed of the sintered layers 41m, 42m, and 43m, uncolored resin powder 2 is incorporated and remains over the whole outer surface corresponding to the inclined surface in the drawing, and thus an unevenly colored region is formed. In addition, the roughness of the sintered resin powder 2 remains as it is on the outer surface corresponding to the inclined surface of the intermediate resin sintered body 1m in the drawing, and smoothness is also poor. It should be noted that in the MJF-type 3D printer, complicated control is required for the temperature of powder surface when melting resin powder such as Polyamide 12 and the amounts of fusing agent and fusion modifier dispersed, and thus it is presumed that they are automatically controlled to increase the convenience of users. It is therefore difficult for users to deliberately improve the state of a resin sintered body.

As described above, a region, which is unevenly colored by incorporation of uncolored resin powder 2 and has the roughness of sintered resin powder 2 remaining as it is, is generated over the whole region in the vicinity of the boundary between the fusing agent and the fusion modifier. The region is not limited to the inclined surface of the example in FIG. 1, and is generated on the whole surface of a resin sintered body product. That is, when forming a resin sintered body by the MJF-type additive manufacturing, because the boundary between the resin powder 2 in the bottom layer and the resin powder 2 in the layer immediately above is the boundary between the fusing agent and the fusion modifier, and the boundary between the resin powder 2 in the uppermost layer and the resin powder 2 in the layer immediately below is the boundary between the fusing agent and the fusion modifier, a region, which is unevenly colored and has the roughness of sintered resin powder 2 remaining as it is, is generated on the lower and upper surfaces of a resin sintered body product. Also when forming a large number of resin sintered bodies in multilayers so that the layers will be laminated upward because of working efficiency in the MJF-type additive manufacturing, because in a middle resin sintered body product the boundary between the resin powder 2 in the bottom layer and the resin powder 2 in the layer immediately above, and the boundary between the resin powder 2 in the uppermost layer and the resin powder 2 in the layer immediately below are each the boundary between the fusing agent and the fusion modifier, a region, which is unevenly colored and has the roughness of sintered resin powder 2 remaining as it is, is generated on the lower and upper surfaces of the middle resin sintered body product.

In the method for producing a resin sintered body in the present embodiment, the step of immersing the intermediate resin sintered body 1m formed as above in an etching bath with a surface treatment liquid containing sulfuric acid and chromic anhydride, in which the concentration of chromic anhydride is 300 g/L or more, is carried out. In this immersion step, it is preferred that the temperature of a surface treatment liquid be maintained at 70° C. or higher from the viewpoint of shortening the treatment time and improving producing efficiency, and it is more suitable that the temperature be maintained at 80° C. or higher from the viewpoint of further shortening the treatment time and further improving producing efficiency. In addition, from the viewpoint of sufficiently coloring the surface 10 of the resin sintered body 1 and increasing reliability for the effect of smoothness, the concentration of sulfuric acid in the surface treatment liquid for immersion is suitably 184 g/L to 368 g/L and the concentration of chromic anhydride is suitably 300 g/L to 500 g/L.

In addition, as long as the time for immersion in a surface treatment liquid is 5 minutes or longer, a certain effect can be obtained; however, from the viewpoint of further improving the exterior, a case where the surface treatment liquid is 70° C. or higher is suitable because a high effect can be certainly obtained by immersion for 20 minutes or longer, and a case where the surface treatment liquid is 80° C. or higher is suitable because a high effect can be certainly obtained by immersion for 10 minutes or longer.

Figure 2:
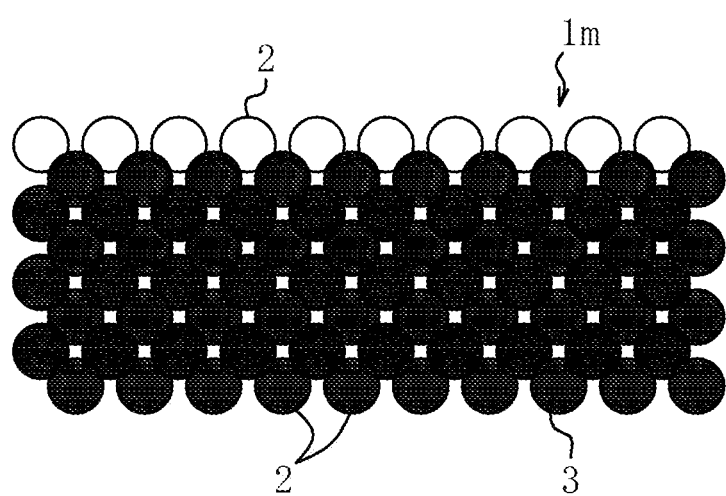
FIGS. 2(a) and (b) are schematic drawings to explain steps, which show the production steps of forming a resin sintered body from the intermediate resin sintered body in the embodiment.
Figure 2:
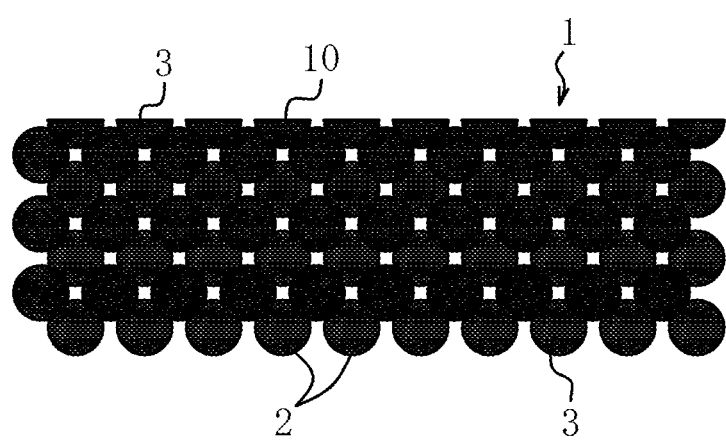
Figure 3:
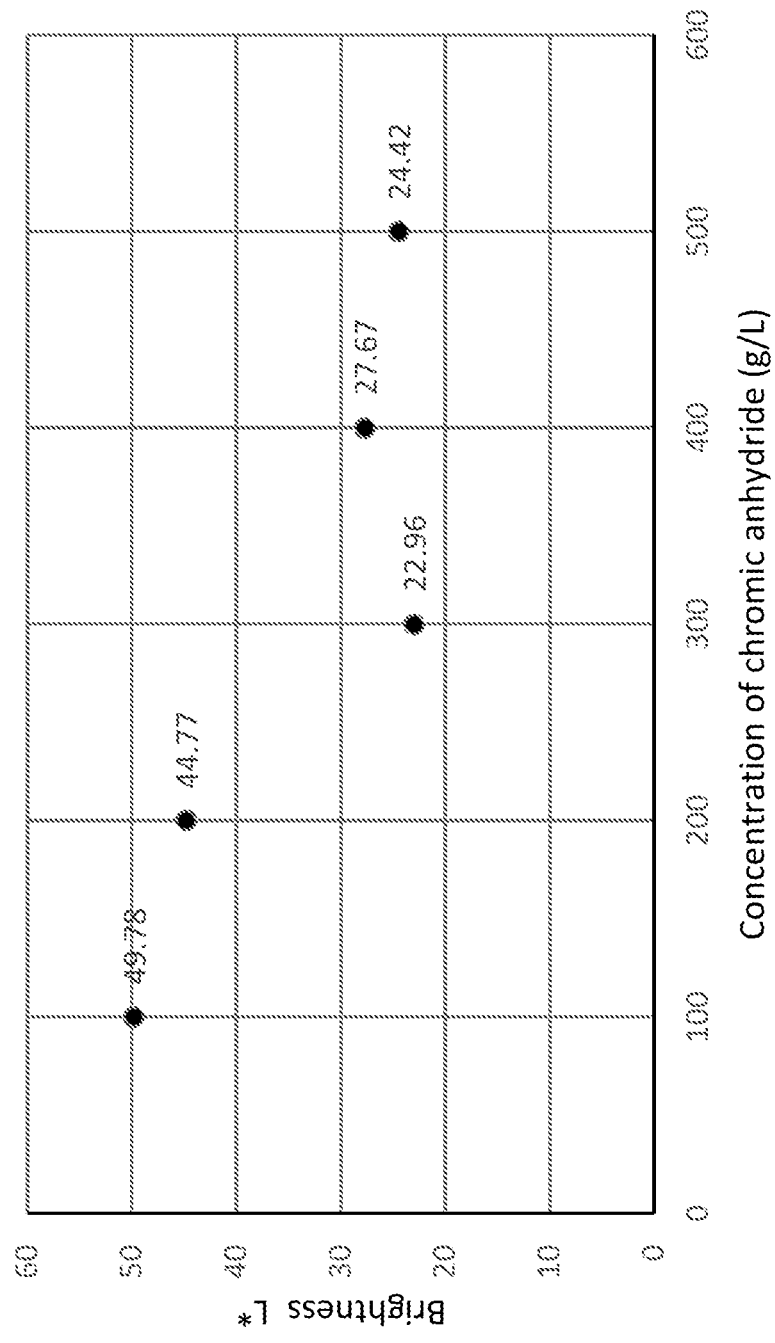
FIG. 3 is a graph which shows a relationship between the concentrations of chromic anhydride in surface treatment liquids in Examples and Comparative Examples and brightness.

A resin sintered body 1 as a finished product is obtained by pulling out the intermediate resin sintered body 1$m$ from the etching bath after the above-described step of immersion in the surface treatment liquid (see FIG. 2). In this resin sintered body 1, uncolored resin powder 2, which has been incorporated into, for example, the sintered layers 41$m$, 42$m$ and 43$m$, is removed, and the surface 10 is evenly and sufficiently colored to an extent required without an unevenly colored region. Furthermore, the surface 10 of the resin sintered body 1 has a good appearance and smoothness by etching.

According to the method for producing a resin sintered body in the present embodiment, about the resin sintered body 1 obtained by applying an ink 3 to layers of thermoplastic resin powder 2 and sintering the layers by the multi jet fusion-type additive manufacturing, the surface of the intermediate resin sintered body 1$m$ is certainly etched in a required range to remove the surface portion of the intermediate resin sintered body 1$m$, which is not evenly colored with the ink 3. The surface 10 of the resin sintered body 1 can be evenly and sufficiently colored to an extent required, also the surface 10 of the resin sintered body 1 has a good appearance and smoothness, and the resin sintered body 1 with an excellent exterior can be obtained. In addition, uniform etching can be carried out by the immersion treatment in a surface treatment liquid without being bound by the shapes of the intermediate resin sintered body 1$m$ and the resin sintered body 1, and thus versatility is excellent.

[Scope Encompassed in Invention Disclosed Herein]

In addition to each described invention and the embodiment, the inventions disclosed herein encompass an invention in which partial contents of the above are changed to other contents disclosed herein in an applicable range, or an invention in which to the contents of the above, other contents disclosed herein are added, or an invention in which partial contents of the above are removed in the extent in which a partial effect is obtained to provide a superordinate concept. In the inventions disclosed herein, the following variant examples and added contents are also encompassed.

Objects to which the method for producing a resin sintered body in the present invention is applied, for example, are not limited to resin sintered bodies formed by applying an ink to layers of thermoplastic resin powder and sintering the layers by the multi jet fusion-type additive manufacturing, and the present invention can be applied to appropriate resin sintered bodies obtained by applying an ink to thermoplastic resin powder and sintering the powder. In addition, the shape of resin sintered bodies to which the present invention is applied is appropriately selected, and the present invention can be applied to almost plate-shaped resin sintered bodies and resin sintered bodies with a variety of cubic shapes. In addition, a case where the temperature of a surface treatment liquid is lower than 70° C., and a case where the concentration of sulfuric acid in a surface treatment liquid is less than 184 g/L are also encompassed in the present invention as long as the effect of improving coloring evenness and smoothness on the surface of a resin sintered body is obtained.

EXAMPLES AND COMPARATIVE EXAMPLES

Resin sintered bodies produced using the method for producing a resin sintered body in the present invention in Examples and Comparative Examples will now be described. Examples 1-8 are shown in Table 1, and Examples 9-13 and Comparative Examples 1-3 are shown in Table 2.

Each base material in Examples 1-13 and Comparative Examples 1-3 was made by the MJF (multi jet fusion)-type 3D printer (manufactured by HP Development Company, L.P.) using Polyamide 12 powder as thermoplastic resin powder, and a carbon black-containing ink as the ink. The composition of the carbon black-containing ink, a fusing agent, was water: 70-80 mass %, 2-pyrrolidone: less than 20 mass %, and carbon black: less than 7.5 mass %. In addition, each base material was made using a fusion modifier (water: 80-90 mass %, triethylene glycol: less than 15 mass %, 2-pyrrolidone: less than 5 mass %) in combination with the fusing agent.

In the production of a resin sintered body by the MJF method, the step of forming layers of Polyamide 12 powder, applying a fusing agent corresponding to a carbon black-containing ink and a fusion modifier to the formed layers, and fusing and sintering the layers by heating or exposure was repeated to form a base material of an intermediate resin sintered body including a plurality of layers. As producing conditions, the surface covered over with Polyamide 12 powder at a thickness of 80 μm was irradiated with a movable light source including 6 halogen lamps with 2000 W or more at a moving speed of 300 mm or more per second. It was presumed that the temperature of the powder surface was automatically controlled in the MJF-type 3D printer to maintain the crystallization temperature of Polyamide 12, 150° C. or higher; however, a detailed temperature was unknown. In addition, detailed amounts of the fusing agent and fusion modifier dispersed by automatic control of the MJF-type 3D printer were unknown; however, it was verified from the actual results of used amount that each was dispersed at up to 0.3 g/mm$^3$. Additionally, each base material has the same structure, shape and size, and Polyamide 12 powder has a crushed grain shape with an average particle size of 60 μm. In addition, the fusing agent is a black liquid with a specific gravity of 1.1 g/cm$^3$ and the fusion modifier is a clear colorless liquid with a specific gravity of 1.0 g/cm$^3$.

Each base material in Examples 1-13 and Comparative Examples 1 and 2 was immersed in an etching bath with a surface treatment liquid containing chromic anhydride as an oxidizing agent and sulfuric acid as a strong acid. The concentration of chromic anhydride (oxidizing agent concentration) and the concentration of sulfuric acid (strong acid concentration) in Examples 1-13 and Comparative Examples 1 and 2 are as shown in Table 1 and Table 2. The base material in Comparative Example 3 was immersed in an etching bath with a surface treatment liquid containing sulfuric acid with a concentration in Table 2 without containing chromic anhydride. In addition, the temperature of an etching bath with a surface treatment liquid and the immersion time in Examples 1-13 and Comparative Example 1-3 are as shown in Tables 1 and 2.

After completion of immersion in each surface treatment liquid, in order to verify whether or not the surface (outer surface) of each base material in Examples 1-13 and Comparative Examples 1-3 was colored black, which has an excellent design, the brightness (L*) in a region with a diameter of 8 mm on the surface (outer surface) of each base material was measured by a spectrophotometric colorimeter (CM-5: manufactured by KONICA MINOLTA, INC.) The brightness (L*) in Examples 1-13 and Comparative Examples 1-3 is shown in Table 1 and Table 2. The experimental results were judged using brightness (L*): 40 or less as the acceptance criterion of a black state which has an excellent design, and brightness (L*): 30 or less as the criterion of a more desired black state.

Comparative Example 3 in Table 2, which was immersed in an etching bath with a surface treatment liquid without containing chromic anhydride, had brightness (L*): 57.53, which significantly departed from the colored state of the acceptance criterion. In addition, when Example 1 (chromic anhydride concentration: 400 g/L), Example 2 (chromic anhydride concentration: 300 g/L), Example 3 (chromic anhydride concentration: 500 g/L), Comparative Example 1 (chromic anhydride concentration: 100 g/L) and Comparative Example 2 (chromic anhydride concentration: 200 g/L) were compared in the same conditions that the concentration of sulfuric acid be 368 g/L, the temperature of an etching bath with a surface treatment liquid be 80° C., and the time for immersion in the etching bath be 20 minutes except that only the concentration of chromic anhydride was changed, examples with a chromic anhydride concentration of 300 g/L or more could clear brightness (L*): 30 or less as the criterion of a more desired black state, while Comparative Examples 1 and 2 with a chromic anhydride concentration of less than 300 g/L could not clear brightness (L*): 40 or less as the acceptance criterion of a black state as shown in Table 1, Table 2 and FIG. 2.

In addition, from the results of Example 6 and Example 9 in the same conditions that the concentration of chromic anhydride be 400 g/L and the concentration of sulfuric acid be 368 g/L except that the temperatures of etching bathes with a surface treatment liquid and the times for immersion in an etching bath were different, when the temperature of an etching bath with a surface treatment liquid is 70° C., an example could clear brightness (L*): 30 or less as the criterion of a more desired black state by immersion for 20 minutes or longer, and when the temperature of an etching bath with a surface treatment liquid is 80° C., an example could clear brightness (L*): 30 or less as the criterion of a more desired black state by immersion for 10 minutes or longer. From the viewpoint of shortening the production time, it is found that the temperature of an etching bath with a surface treating liquid is preferably 80° C. or higher.

TABLE 1

|  | Example 1 | Example 2 | Example 3 | Example 4 | Example 5 | Example 6 | Example 7 | Example 8 |
|---|---|---|---|---|---|---|---|---|
| Base material | PA12 | PA12 | PA12 | PA12 | PA12 | PA12 | PA12 | PA12 |
| Ink applied to base material | CB ink | CB ink | CB ink | CB ink | CB ink | CB ink | CB ink | CB ink |
| Oxidizing agent | Chromic anhydride | Chromic anhydride | Chromic anhydride | Chromic anhydride | Chromic anhydride | Chromic anhydride | Chromic anhydride | Chromic anhydride |
| Oxidizing agent concentration (g/L) | 400 | 300 | 500 | 400 | 400 | 400 | 400 | 400 |
| Strong acid | sulfuric acid | sulfuric acid | sulfuric acid | sulfuric acid | sulfuric acid | sulfuric acid | sulfuric acid | sulfuric acid |
| Strong acid concentration (g/L) | 368 | 368 | 368 | 184 | 368 | 368 | 368 | 368 |
| Temperature of etching bath (° C.) | 80 | 80 | 80 | 80 | 80 | 80 | 80 | 70 |
| Immersion time (minute) | 20 | 20 | 20 | 20 | 5 | 10 | 60 | 10 |
| Brightness L* | 27.67 | 22.96 | 24.42 | 22.87 | 31.54 | 28.51 | 26.21 | 30.76 |

TABLE 2

|  | Example 9 | Example 10 | Example 11 | Example 12 | Example 13 | Comparative example 1 | Comparative example 2 | Comparative example 3 |
|---|---|---|---|---|---|---|---|---|
| Base material | PA12 | PA12 | PA12 | PA12 | PA12 | PA12 | PA12 | PA12 |
| Ink applied to base material | CB ink | CB ink | CB ink | CB ink | CB ink | CB ink | CB ink | CB ink |
| Oxidizing agent | Chromic anhydride | Chromic anhydride | Chromic anhydride | Chromic anhydride | Chromic anhydride | Chromic anhydride | Chromic anhydride | None |
| Oxidizing agent concentration (g/L) | 400 | 400 | 400 | 400 | 400 | 100 | 200 | 0 |
| Strong acid | sulfuric acid | sulfuric acid | sulfuric acid | sulfuric acid | sulfuric acid | sulfuric acid | sulfuric acid | Sulfuric acid |
| Strong acid concentration (g/L) | 368 | 368 | 368 | 368 | 368 | 368 | 368 | 368 |

TABLE 2-continued

| | Example 9 | Example 10 | Example 11 | Example 12 | Example 13 | Comparative example 1 | Comparative example 2 | Comparative example 3 |
|---|---|---|---|---|---|---|---|---|
| Temperature of etching bath (° C.) | 70 | 70 | 90 | 90 | 90 | 80 | 80 | 70 |
| Immersion time (minute) | 20 | 90 | 10 | 20 | 60 | 20 | 20 | 20 |
| Brightness L* | 27.51 | 24.67 | 27.11 | 26.59 | 28.9 | 49.78 | 44.77 | 57.53 |

INDUSTRIAL APPLICABILITY

The present invention can be used when producing a resin sintered body by sintering thermoplastic resin powder.

REFERENCE SIGN LIST

1: Resin sintered body, 10: Surface, 1m: Intermediate resin sintered body, 2: Resin powder, 3: Ink, and 41m, 42m, 43m: Sintered layer.

The invention claimed is:

1. A method for producing a resin sintered body, comprising repeating steps to produce an intermediate resin sintered body having an uncolored region on a surface thereof by forming layers of thermoplastic resin powder, applying to each desired site in the layers of thermoplastic resin powder a fusing agent including a coloring ink and a fusion modifier, followed by fusing and sintering the layers of thermoplastic resin powder by multi jet fusion additive manufacturing;

the method further comprising a step of immersing the intermediate resin sintered body, which has the unevenly colored region on the surface thereof and a whole of which has been already sintered, in a treatment liquid containing sulfuric acid and chromic anhydride, to remove uncolored resin powder.

2. The method for producing a resin sintered body according to claim 1, wherein in the step of immersion in the treatment liquid, a concentration of the chromic anhydride in the treatment liquid is 300 g/L or more and a time for immersion is 5 minutes or longer.

3. The method for producing a resin sintered body according to claim 1, wherein the step of immersing the intermediate resin sintered body in the surface treatment liquid is carried out with a temperature of the surface treatment liquid maintained at 70° C. or higher.

4. The method for producing a resin sintered body according to claim 2, wherein the step of immersing the intermediate resin sintered body in the surface treatment liquid is carried out with a temperature of the surface treatment liquid maintained at 70° C. or higher.

5. The method for producing a resin sintered body according to claim 1, wherein the step of immersion in the surface treatment liquid is carried out with a concentration of the sulfuric acid set at 184 g/L to 368 g/L and a concentration of the chromic anhydride set at 300 g/L to 500 g/L in the surface treatment liquid.

6. The method for producing a resin sintered body according to claim 2, wherein the step of immersion in the surface treatment liquid is carried out with a concentration of the sulfuric acid set at 184 g/L to 368 g/L and a concentration of the chromic anhydride set at 300 g/L to 500 g/L in the surface treatment liquid.

7. The method for producing a resin sintered body according to claim 3, wherein the step of immersion in the surface treatment liquid is carried out with a concentration of the sulfuric acid set at 184 g/L to 368 g/L and a concentration of the chromic anhydride set at 300 g/L to 500 g/L in the surface treatment liquid.

8. The method for producing a resin sintered body according to claim 4, wherein the step of immersion in the surface treatment liquid is carried out with a concentration of the sulfuric acid set at 184 g/L to 368 g/L and a concentration of the chromic anhydride set at 300 g/L to 500 g/L in the surface treatment liquid.

9. The method for producing a resin sintered body according to claim 1, wherein the thermoplastic resin is Polyamide 12.

10. The method for producing a resin sintered body according to claim 2, wherein the thermoplastic resin is Polyamide 12.

11. The method for producing a resin sintered body according to claim 3, wherein the thermoplastic resin is Polyamide 12.

12. The method for producing a resin sintered body according to claim 4, wherein the thermoplastic resin is Polyamide 12.

13. The method for producing a resin sintered body according to claim 5, wherein the thermoplastic resin is Polyamide 12.

14. The method for producing a resin sintered body according to claim 6, wherein the thermoplastic resin is Polyamide 12.

15. The method for producing a resin sintered body according to claim 7, wherein the thermoplastic resin is Polyamide 12.

16. The method for producing a resin sintered body according to claim 8, wherein the thermoplastic resin is Polyamide 12.

* * * * *